United States Patent
Newsome et al.

(10) Patent No.: US 7,213,755 B2
(45) Date of Patent: May 8, 2007

(54) SYSTEM FOR RAPIDLY DISPENSING AND ADDING VALUE TO FARE CARDS

(75) Inventors: Matthew J. Newsome, San Diego, CA (US); Graham H. Hilton, San Diego, CA (US); Paula M. Miller, San Diego, CA (US); Jesse Shackleford, San Diego, CA (US); Chad S. Sanfilippo, Ramona, CA (US); Mark Varney, West Sussex (GB); Kevin Bryant, Surrey (GB); Gavin Ford, Surrey (GB)

(73) Assignee: Cubic Corporation, San Diego, CA (US)

( * ) Notice: Subject to any disclaimer, the term of this patent is extended or adjusted under 35 U.S.C. 154(b) by 251 days.

(21) Appl. No.: 10/623,899

(22) Filed: Jul. 21, 2003

(65) Prior Publication Data

US 2004/0016801 A1 Jan. 29, 2004

Related U.S. Application Data

(63) Continuation-in-part of application No. 09/693,386, filed on Oct. 20, 2000, now Pat. No. 6,595,416.

(60) Provisional application No. 60/160,681, filed on Oct. 21, 1999.

(51) Int. Cl.
*G07B 15/02* (2006.01)
(52) U.S. Cl. .................. 235/384; 235/380; 235/381
(58) Field of Classification Search ................ 235/384, 235/380, 381, 382, 383; 705/13, 21, 39, 705/41
See application file for complete search history.

(56) References Cited

U.S. PATENT DOCUMENTS

| | | | |
|---|---|---|---|
| 4,778,983 A | | 10/1988 | Ushikubo |
| 4,977,502 A | * | 12/1990 | Baker et al. ................. 235/384 |
| 4,992,647 A | | 2/1991 | Konishi et al. |
| 5,043,561 A | * | 8/1991 | Kimata ........................ 235/384 |

(Continued)

FOREIGN PATENT DOCUMENTS

EP 361110 A2 * 4/1990

(Continued)

OTHER PUBLICATIONS

Singapore Transit Authority Awards Cubic Trasportation System $23.6 Million Contract For Smart Card Ticketing Machines, Apr. 1999, Cubic Corporation, 1999 Press Releases.

(Continued)

*Primary Examiner*—Uyen-Chau N. Le
(74) *Attorney, Agent, or Firm*—Townsend and Townsend and Crew

(57) ABSTRACT

An add value terminal provides an automatic fare collection environment with a compact, easy to use, and easy to install device that re-values and issues transit fare smart cards exclusively utilizing credit and debit functions. The add value terminal alleviates long lines often associated with automatic vending machines that allow bill and coin transactions. The add value terminal also can be configured to sell tickets in out-of-station environments including malls, grocery stores, post offices, and airports.

20 Claims, 4 Drawing Sheets

U.S. PATENT DOCUMENTS

| | | | |
|---|---|---|---|
| 5,255,182 A * | 10/1993 | Adams | 705/21 |
| 5,274,218 A * | 12/1993 | Urata et al. | 235/449 |
| 5,352,876 A | 10/1994 | Watanabe et al. | |
| 5,397,886 A | 3/1995 | Mos et al. | |
| 5,409,092 A | 4/1995 | Itako et al. | |
| 5,550,360 A * | 8/1996 | Muraoka | 235/384 |
| 5,754,654 A * | 5/1998 | Hiroya et al. | 705/76 |
| 5,832,090 A * | 11/1998 | Raspotnik | 705/66 |
| 5,969,332 A | 10/1999 | Ueda et al. | |
| 6,003,776 A * | 12/1999 | Drupsteen | 235/380 |
| 6,010,074 A * | 1/2000 | Kelly et al. | 235/382 |
| 6,129,275 A * | 10/2000 | Urquhart et al. | 235/381 |
| 6,732,922 B2 * | 5/2004 | Lindgren et al. | 235/381 |
| 6,916,244 B2 * | 7/2005 | Gatto et al. | 463/25 |
| 2001/0056412 A1 * | 12/2001 | Kutsuzawa et al. | 705/80 |
| 2003/0019927 A1 | 1/2003 | Lindgren et al. | |

FOREIGN PATENT DOCUMENTS

| | | |
|---|---|---|
| EP | 0380377 A1 | 8/1990 |
| EP | 0597135 A1 | 5/1994 |
| EP | 0608197 A1 | 7/1994 |
| EP | 0713198 A2 | 5/1996 |
| EP | 0789331 A1 | 8/1997 |
| EP | 797174 A2 | 9/1997 |
| GB | 2267626 | 12/1993 |
| GB | 2317258 | 3/1998 |
| JP | 02148290 A * | 6/1990 |
| JP | 02254585 | 10/1990 |
| JP | 04181493 A * | 6/1992 |
| JP | 05028335 A * | 2/1993 |
| JP | 05108929 A * | 4/1993 |
| JP | 06131521 | 5/1994 |
| JP | 06131521 A * | 5/1994 |
| JP | 06131523 A * | 5/1994 |
| JP | 08045044 A * | 2/1996 |
| JP | 09062882 | 3/1997 |
| JP | 09305806 A * | 11/1997 |
| JP | 10283515 A * | 10/1998 |
| JP | 11156036 A * | 6/1999 |
| JP | 2000137840 | 5/2000 |
| JP | 2000137840 A * | 5/2000 |
| JP | 2000322614 | 11/2000 |
| WO | WO-200129774 A2 | 4/2001 |

OTHER PUBLICATIONS

Cubic Receives $33.4 Million Oder From MTA New York City Transit For Additional MetroCard Vending Machines, Jun. 1999, Cubic Corporation, 2000 Press Releases.

Metro Launces Test of New Fareboxes in 80 Buses—New Fareboxes Accept SmarTrip Cards, Nov. 2002, WMATA, Metro Press Releases.

SmarTrip More Than A Smart Card. It's Pure Genius, 1998-2002, WMATA, SmarTrip.

* cited by examiner

SYSTEM FOR RAPIDLY DISPENSING AND ADDING VALUE TO FARE CARDS

This application is a continuation in part of U.S. patent application Ser. No. 09/693,386 filed Oct. 20, 2000, issuing as U.S. Pat. No. 6,595,416 on Jul. 22, 2003, which claims priority under 35 U.S.C. 119(e) to provisional U.S. Patent Application No. 60/160,681 filed Oct. 21, 1999.

FIELD OF THE INVENTION

The present invention relates generally to terminals for adding monetary value to fare cards, and more specifically to a debit/credit only terminal for adding monetary value to fare cards and/or smart cards.

BACKGROUND OF THE INVENTION

The use of fare cards in mass transit systems has reached record levels with the successful introduction of free transfers, unlimited passes, and fare pricing systems based on distance traveled, time of day, and user categorization including age and frequent user. Automatic fare collection utilizing fare cards increases security through the elimination of person-to-person cash exchanges, decreases operating costs based upon a decrease in required personnel and an automation of system accounting, and improves commuter convenience by eliminating ticket window lines and ticket purchases for each transit system ride.

Fare cards are available in various formats including magnetic stripe cards, contact smart cards and contactless smart cards.

The term "smart card" is typically used to refer to any of one of a various types of cards, approximately the size of a credit card, having an embedded integrated circuit for storing and processing information, and a transceiver to communicate with a smart card communication device. In addition to transit system fare payment, smart cards may be used in a variety of applications including telephone calling, electronic cash payments, identification systems, secure entrance passes, etc. The reference to "smart cards" within this disclosure includes both contact and non-contact cards. The smart card communication device communicates through the transceiver or contacts on the smart card to access the stored information. The smart card communication device may simply read the information, load the information into the memory device and/or modify existing data in the memory device.

Transit fare cards may be purchased at automatic vending machines which accept bills/coins, credit, and debit cards. The value of the card may be limited to the value of a single transit fare, or may exceed the value of a single transit fare so that the card may be used for multiple fares. A fare card having a value exceeding one transit fare offers an advantage of a single financial transaction for multiple rides. In addition, since the fare collection systems deduct value automatically for time and/or distance based fares, the rider does not need to compute exact fare amount as long as the amount on the card equals or exceeds the required fare, and thus, the time the rider spends at a fare card dispensing machine is shortened. Any monetary value remaining on the card is usable for a subsequent fare. Fare cards also offer the advantage of being reusable. The transit rider can reload a value onto his or her existing fare card at an automatic fare vending machine. These machines accept a payment from the transit rider of bills, coins, credit cards, and debit cards.

Current automatic vending machines offer the above stated advantages of re-use of a card and quick transaction times. However, during peak commuter hours, commuters are often faced with lines at the automatic fare vending machines. Delays in obtaining upgraded fare cards often are caused by bill/coin transactions and the cumbersome process of commuters having to insert coins and bills into a vending machine. In particular, a common experience for a commuter is to have a bill rejected multiple times because the bill is folded, creased and/or worn. Thus, as a commuter is fumbling with coins and cash, or is attempting to coerce a bill into a machine, other commuters have no choice but to wait in line for an available machine.

Bill and coin machines also have a disadvantage of shortened expected mean cycle between failures due to the mechanical components, required for accepting bills and coins, that are apt to fail or malfunction. These vending machines present a further disadvantage of a vandalism target since the machines are known to hold cash. Further, the physical size of the existing vending machines limit where the machines can be located. For example, retail stores located outside of a transit station setting typically would not have space for a bulky vending machine.

Thus, there is a continuing need to enhance the capacity of an automatic fare collection (AFC) system to allow for value and time replenishment of existing fare cards in a time efficient manner. A need exists for vending machines having improved mean cycles between failure. A further pressing need is to provide an add value/time capability for all card types, including magnetic stripe cards and smart cards, within the existing AFC system locations, commonly located in subway/train systems, and in locations outside the AFC system such as bus terminals. A also exists for a fare card terminal which is available to bus patrons and those who do not have ready access to terminals in a subway or train station.

SUMMARY OF THE INVENTION

It is an advantage of the present invention to provide a means for adding value to cards by patrons employing solely credit/debit payment mechanisms.

It is a further advantage to improve the overall mean cycle between failure of an add value machine.

It is still a further advantage of the present invention to improve commuter satisfaction by providing an add value machine that requires less transaction time.

Yet another advantage is to provide a machine for adding value to fare cards that is easy to install and compatible with the existing automatic fare collection system.

It is yet another advantage to provide a compact machine for installation into locations outside of the transit system.

An add value terminal of the exemplary embodiment provides a quick and simple means of adding value to a fare card using only a debit or credit card. Add value terminals shorten customer lines for customers waiting to upgrade their fare cards because simple credit/debit transactions require less time than transactions involving bills and coins. Thus, an add value terminal expedites the purchase of fare cards at automatic vending machine locations by attracting patrons to credit/debit terminals that do not accept bills and coins.

An add value terminal of the exemplary embodiment is a compact cabinet that may be installed on a wall, pedestal, or pillar. The terminal has a user friendly interface that utilizes a display, selection buttons, raised lettering, Braille, and an audio output jack to prompt and instruct a patron through the steps required to add value, upgrade, or verify the status of his or her fare card. The add value terminal of the exemplary embodiment accepts magnetic stripe fare cards, contact smart cards and contactless smart cards. The term "fare card" as used herein includes magnetic stripe, contact smart cards, and contactless smart cards unless there is a stated card-type distinction. The magnetic stripe fare cards are inserted into a fare card bezel to allow a ticket transport to read data from the card. Contact smart cards are inserted into a contact-type card reader which makes contact with contact pads on the surface of the card. Contactless smart card data is communicated to the add value terminal through the use of a contactless, e.g., radio frequency (RF), smart card reader interface. The patron simply moves the smart card with an RF field of the contactless smart card reader each time he or she is prompted to do so by the display.

The display of the add value terminal prompts a patron to insert a fare card. Once the fare card is inserted into the appropriate bezel or waved past the contactless smart card reader, the status of the fare card is displayed. The add value terminal of the exemplary embodiment displays the current period and card expiration dates, the remaining value, the number of rides remaining and/or the upgrade status of the card. The display then prompts the patron to make a selection of a desired transaction. The patron selects the transaction type by pressing a selection button as indicated by the display prompts. Typical transactions of the exemplary embodiment include verifying the fare card status, upgrading the fare card, adding value to the fare card, and/or adding time to the fare card. A patron may cancel a transaction at any time by pressing a cancellation button.

After the patron has selected a transaction type, the display prompts the patron for a method of payment. The patron selects the appropriate selection button and inserts a credit or debit card into a credit/debit card reader and enters any required personal identification numbers on a PIN keypad. The add value terminal communicates the debit/credit information to a bank authorization network. Once verification is received, the patron selects the time, value, or upgrade status to be added to the card. The add value terminal updates the card status utilizing the appropriate reader, that is, as the magnetic stripe card is removed from the magnetic strip reader, as contact is made with the contact smart card, or when the contactless smart card is placed within the RF field. If the patron chooses to receive a transaction receipt, a printer receipt is delivered to the patron through the printer cup located on the add value terminal cabinet.

In an exemplary embodiment of the invention, the magnetic stripe credit/debit card reader has the capability to read from and write to contact smart cards, thus eliminating the need for a separate contact-type smart card reader. In other exemplary embodiments, the magnetic stripe fare card reader accepts contact fare cards. Similarly, the add value terminal may combine the functions of any of the credit/debit card reader, the contact-type reader, and the magnetic stripe fare card reader.

The add value terminals of the exemplary embodiment are connected through station controllers and associated communication network equipment to a transit system area controller utilizing existing digital lines or fiber optic lines. The transit area controller monitors both out-of-system and in-system add value terminals. Out-of-system refers to add value terminals that are located outside of a transit system terminal. Typical out-of system locations include grocery stores, malls, bus terminals, and airports. In-system add value terminals are located in the transit system station, e.g. a train/subway station, and are networked with other automatic vending machines, token booths, turnstile equipment and fare card readers to the area controller.

The elimination of bill/coin transactions improves the overall Mean Cycle Between Failure (MCBF) statistics, decreases the cost of money collection and processing, and lowers the maintenance costs of the transit system automatic vending services. The primary benefits of the add value terminal include a low initial capital cost through the incorporation of existing transit system components into the add value terminal design, high reliability and low maintenance due to the increase in MCBF, a small compact cabinet, low security risk because the machine contains no cash or pre-valued fare media, fare card re-use, ease of use, low cost of installation, and common spares with existing transit system equipment.

BRIEF DESCRIPTION OF THE DRAWINGS

The present invention will be better understood from the following detailed description of a first embodiment of the invention, taken in conjunction with the accompanying drawings in which like reference numerals refer to like parts and in which.

DESCRIPTION OF THE PREFERRED EMBODIMENT

The following detailed description utilizes a number of acronyms which are generally well known in the art. While definitions are typically provided with the first instance of each acronym, for convenience, Table 1 below provides a list of the acronyms and their respective definitions.

TABLE

| ACRONYM | DEFINITION |
| --- | --- |
| AFC | Automatic Fare Collection |
| AVT | Add Value Terminal |
| AVM | Automatic Vending Machines |
| CSC | Contactless Smart Cards |
| MCBF | Mean Cycle Between Failure |
| PCB | Printed Circuit Board |

The add value terminal (AVT) of a preferred embodiment of the present invention is designed for commuter convenience by lessening the time required to purchase, upgrade, add value, or add time to a fare card. The add value terminal dispenses and/or adds value to fare cards, including magnetic stripe cards, contact smart cards and contactless smart cards, utilizing credit and debit accounts, only. For commuters who must purchase a new fare card, the add value terminal also adds value to ready-for-sale fare cards that may be located in a separate simple storage hopper, mounted on the outside of the add value terminal cabinet, or supplied by a co-located host facility or organization such as a merchant or service organization.

Figure 1:
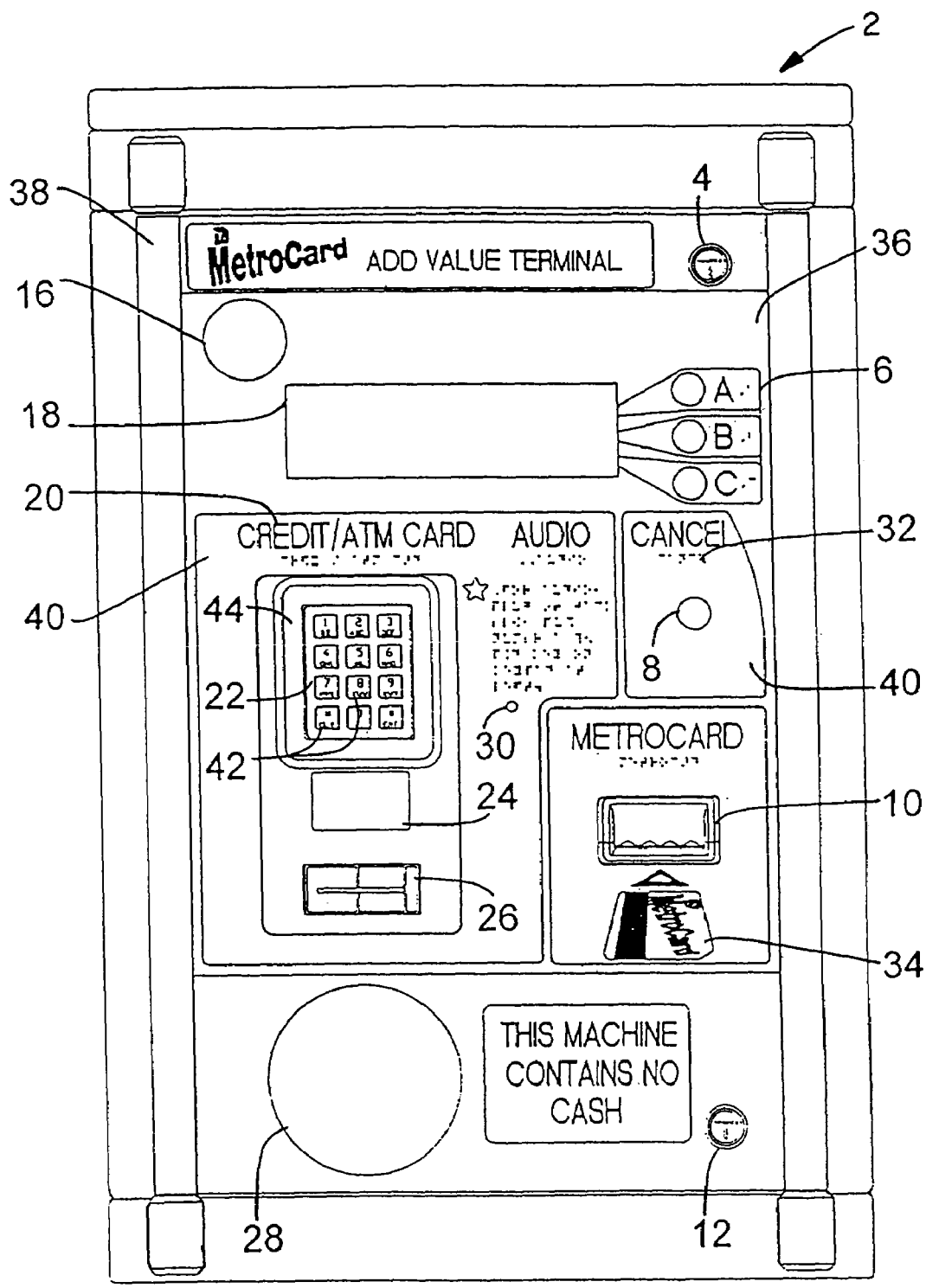
FIG. 1 is a front view of a preferred embodiment of an add value terminal for rapidly dispensing and adding value to a fare card.

Referring to FIG. 1, the add value terminal (AVT) cabinet 2 of a preferred embodiment measures approximately 30.25" (76.84 cm) in height, 18" (45.72 cm) in width, and 10.5" (26.67 cm) in depth. The AVT cabinet 2 of other embodiments may be configured to fit within a pre-existing space, for example, where the AVT cabinet 2 replaces another automatic vending machine. The AVT cabinet 2 of a preferred embodiment is made from 14 gauge, or thinner, stainless steel that is finished to match existing automatic vending machines of a transit system. An AVT cabinet 2 that utilizes 14 gauge steel has an approximate weight of 90 lbs, and thus, is relatively easy to handle for installation purposes within or outside of a transit system. In a preferred embodiment, all AVT cabinet seams are sealed to prevent the ingress of water to the internal components of the added value terminal 2.

In an alternate embodiment of the present invention, the add value terminal cabinet 2 is molded from a durable, vandal resistant, high impact plastic material to reduce cabinet weight. These materials, used in numerous consumer and industrial products, meet all UL, EMC, and environmental standards while greatly improving producibility and ease of installation due to the decrease in cabinet weight.

The AVT front panel 36, which is also the front door of the AVT cabinet 2 of the preferred embodiment, contains all of the components and basic instructions required for a patron to initiate and complete a transaction. The front panel components of a preferred embodiment include a patron display 18, selection buttons 6, a magnetic stripe fare card reader entry bezel 10, a contactless smart card reader 28, a debit/credit card reader 26 and PIN pad 22, a printer receipt cup 24, an audio jack 30, other bezels 40 with text 20 and Braille 32 instructions, and a security mirror 16. In a preferred embodiment of the invention, the debit/credit card reader 26, or alternatively, the magnetic stripe fare card reader, is utilized to read from and write to contact smart cards.

The commuter/patron interfaces of a preferred embodiment are mounted to the front door 36 that is removable or is hinged open to allow access to all internal components of the added value terminal. The front door 36 of a preferred embodiment includes a front door hinge 38 located on the left side of the AVT cabinet 2 that allows the front door 36 to be hinged open. The front door 36 includes two high security locks 4, 12 to lock the front door 36 securely to the AVT cabinet 2 frame. The upper high security lock 4 and the lower high security lock 12 of the preferred embodiment utilize a single key. Alternate embodiments utilize separate keys for each lock 4, 12.

The AVT cabinet 2 of the preferred embodiment is designed to be mounted to a pedestal, a pillar, or directly to a wall, and is designed to have an overall appearance that matches the appearance of existing automatic vending machines. For example, an embodiment of the present invention includes one or more flat-plated, ceramic-coated colored steel plates 40 with raised character text 20 and Braille 32 information, similar to an AVM design for an existing city transit system.

Figure 2A:
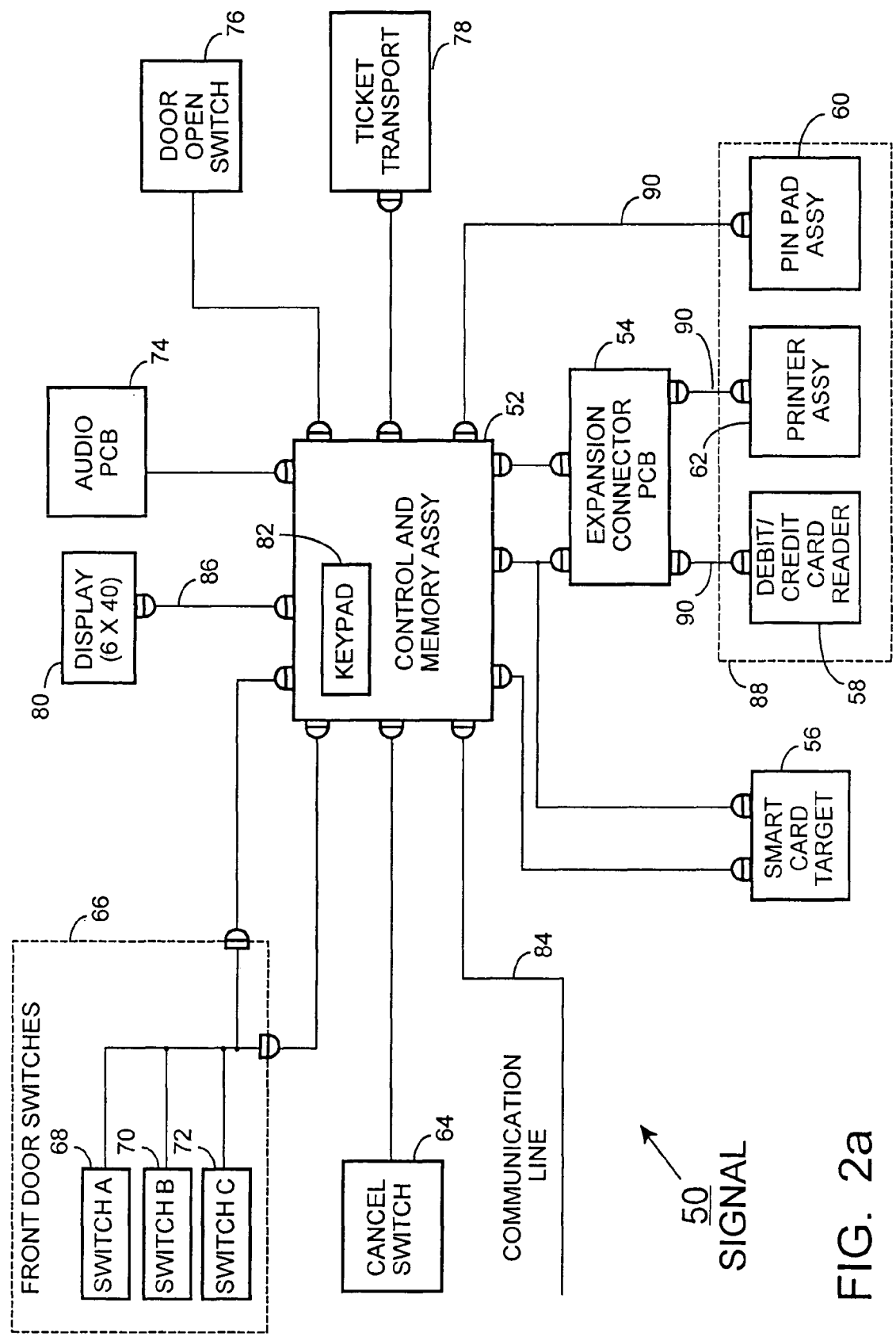
FIG. 2a is a block diagram of the signal circuitry for an add value terminal of a preferred embodiment.

The add value terminal of a preferred embodiment is designed with a user-friendly interface for the purpose of minimizing the time that commuters/patrons spend using the automatic fare collection equipment. The AVT cabinet 2 includes a display 18 that is mountable on the cabinet front door 36 for displaying option prompts, as well as information regarding fares, present card value, and added card value. Referring to FIG. 2a illustrating the signal block diagram 50 of the present invention, the display 80 of a preferred embodiment is a six line by forty character (6×40) alphanumeric display. The display assembly 80 of a preferred embodiment utilizes any of a variety of suitable technologies, including a vacuum fluorescent display (VFD) module that displays the ASCI character set. The display 80 is controlled by the control and memory card assembly 52 through a parallel interface 86. The add value terminal generates and displays messages and instructions on the display 80 to guide the patron through a transaction. The patron display 18 can also be used to scroll text messages, e.g. advertisements and announcements, across the screen while the add value terminal 2 is idle. Messages may be downloaded to the add value terminal 2 via an area controller, or locally via a laptop or handheld personal computer.

Referring again to FIG. 1, the display options are chosen by depressing one of several selection buttons 6 that are mounted beside the display 18 to provide a simple but rugged, easy-to-use menu selection mechanism for patron operation. The preferred embodiment utilizes three selection buttons 6 located to the right of the display 18. These buttons are multi-functional depending upon the patron instructions displayed on the screen 18. Another embodiment incorporates any number of buttons 6 into the design as required by the specific application and/or prompting software. A cancel button 8 is provided to end a transaction at any time. As shown in FIG. 2a, the cancel button 64 is connected directly to the control and memory card assembly 52 to reset the added value terminal to a pre-determined state. Other embodiments of the present invention incorporate touch screen display technology that eliminates the need for selection buttons 6 or that serves as a back-up user interface for extended mean cycle between failure (MCBF). The preferred embodiment utilizes stainless steel selection buttons 6 for use in an automatic fare collection environment that is often exposed to moisture and condensation.

Figure 3:
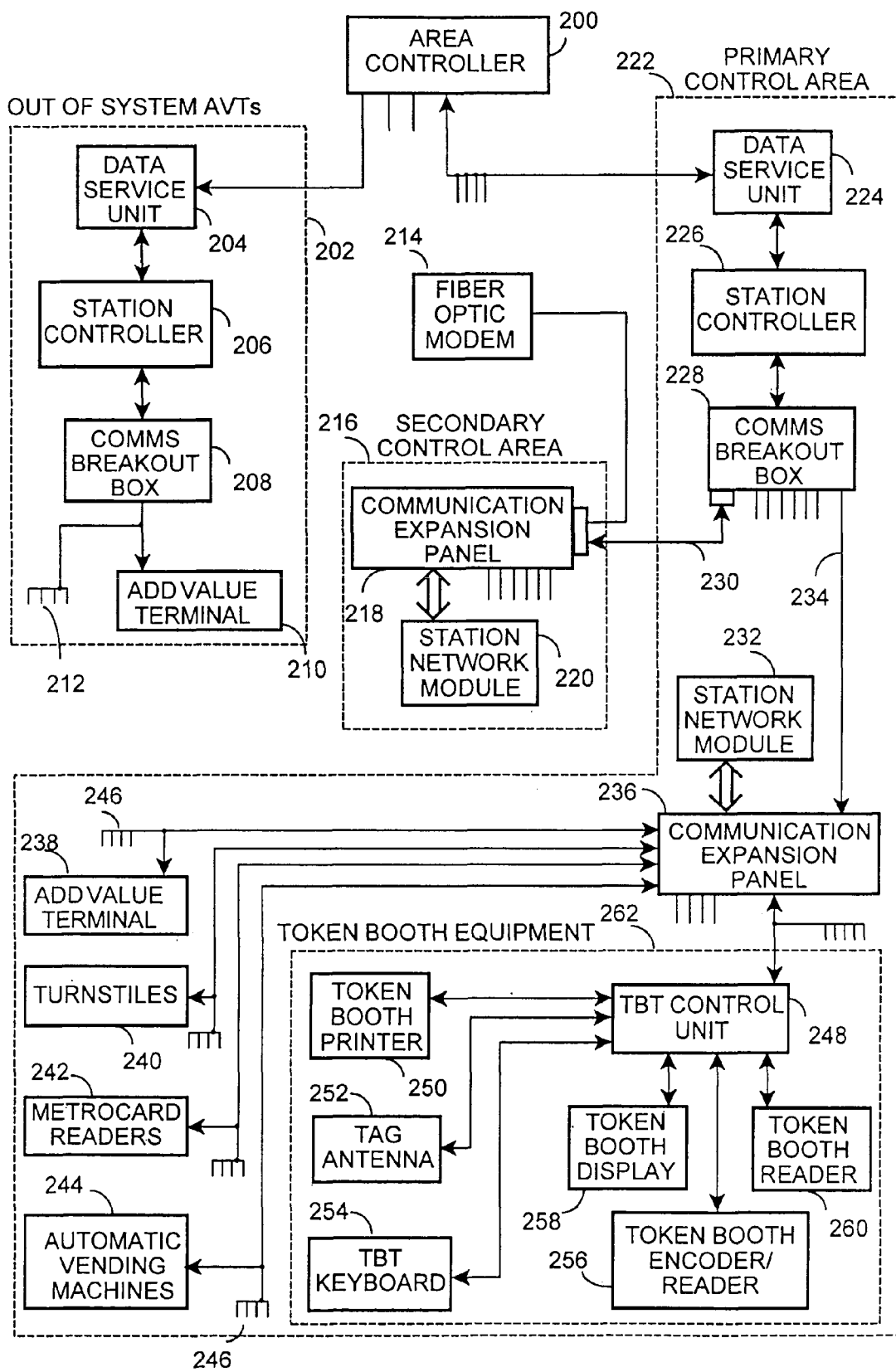
FIG. 3 is a block diagram of add value terminals included in the automatic fare collection equipment of an existing transit system.

As shown in FIG. 2a, the control and memory card assembly 52 controls the operation of the add value terminal and communicates transactions and status to the station controller via a station control communication line 84. The control and memory assembly 52 of the preferred embodiment may be chosen to be identical to the control and memory circuit card assembly used throughout the existing transit system. In a preferred embodiment, the memory contains at least 3 Megabytes of battery-backed memory, configured as six 512K×8 SRAMs, for storage of status, audit, and transaction information in the event of, e.g., a power disruption. The AVT 2 has a capability of storing data for a specified number of days to protect against the possibility of data loss due to a temporary unavailability of the station controller 226 as shown in FIG. 3. The add value terminal 2 of the preferred embodiment can either upload information to the area controller 200 after each transaction, or can periodically upload a transaction history at predetermined intervals. Alternatively, the station controller 200 can request upload of information from the ADT 2 at any time.

A debit/credit module 88, as shown in FIG. 2a, of the add value terminal provides means of payment using a credit or debit card. The debit/credit module 88 of the preferred embodiment includes a debit/credit card reader 58. The debit credit card reader 58 of the preferred embodiment may also be used for reading from and writing to contact smart cards. Continuing with FIG. 2a, a pin pad assembly 60 and a printer assembly 62 are controlled by a control and memory card assembly 52 through serial communication links 90 and an expansion connector circuit card 54.

The debit/credit card reader 58 of the add value terminal of a preferred embodiment may be chosen to be identical to a debit/credit card reader used in an existing city transit automatic vending machine. The use of identical parts lowers production costs and minimizes inventory count for replacement parts. The debit/credit card reader 58 of a preferred embodiment is connected to the control and memory circuit card assembly 52 through an expansion connector circuit card 54. Referring to FIG. 1, the debit/credit card reader 26 is a manually operated insertion device that can read magnetic stripe data. In a preferred alternate embodiment of the invention, the debit/credit card reader 26 also includes a contact reader that makes contact with the contact leads of a contact smart card when the card is inserted into the reader. The reader 26 has fully enclosed, vandal resistant electronics and switches. The debit/credit card reader 26 of a preferred embodiment is capable of accepting standard size (2.125"×3.375") cards, such as Visa and MasterCard per ISO 7810. The debit/credit card reader 26 shown in FIG. 1 accepts cards horizontally and is capable of reading any track at 75 or 210 BPI data during removal of the card. Other embodiments of the present invention may utilize a card reader that is designed into the add value terminal to accept cards vertically. The debit/credit card reader 26 of a preferred embodiment is designed such that the customer can continually grasp the card and the card can be withdrawn at any time.

The add value terminal personal identification number (PIN) pad assembly 60, shown in FIG. 2*a*, may also be identical to a PIN pad utilized in the existing transit system that incorporates the use of the added value terminal. The PIN pad is connected to the control and memory circuit card assembly 52 through a serial communication link 90. Referring back to FIG. 1, the PIN keypad 22 is a twelve key unit in a standard handset configuration. A Braille dot on the number "5" key indicates the relationship of the keys for the visually impaired. The push-button keys 42 provide tactile feedback to the customer, and are sealed to protect the electronics inside the keypad housing 44. The push-button keys 42 and the keypad housing 44 of a preferred embodiment are made from durable, vandal resistant, stainless steel. To prevent vandalism, the PIN keypad 22 is only removable from within the add value terminal 2.

Referring to FIG. 2*a*, the printer assembly 62 of a preferred embodiment is connected to the control and memory card assembly 52 through an expansion connector circuit card 54 and serial communication link 90. The printer assembly 62 issues receipts for patron transactions and for audit reports to authorized personnel as required. The printer assembly 62 of a preferred embodiment is a thermal unit capable of printing ⅛-inch high characters, various fonts and graphics. A paper roll utilized in the printer assembly 62 of the preferred embodiment typically provides approximately 950 receipts at 4-inches in length. The printer assembly 62 of the add value terminal is designed to maximize the size of the receipt roll, thereby reducing the frequency of paper roll servicing. The printer assembly 62 of an alternate embodiment provides easy access to the receipt paper without exposing the electronics. The printer assembly 62 includes sensors to detect stack low and paper jam conditions. The printer assembly 62 status is monitored by the control and memory circuit card 52 which in turn sends an appropriate status message to an area controller through area communications lines 84. Replacing paper and clearing fare card jams is accomplished by fingertip maintenance.

The printer assembly 62 utilizes an internal controller printed circuit board to optimize print head and mechanism control, power management, print speed and quality. Referring to FIG. 1, if the supply of receipt paper is exhausted, the patron is so advised on the patron display 18. The patron is also prompted to indicate whether he or she wishes to continue the transaction without a receipt. Upon completion of printing, a receipt is cut and deposited in a receipt cup 24. The printer assembly 62 of a preferred embodiment provides smudge proof receipts so that the receipt is readable despite unfavorable operational conditions.

Referring to FIGS. 1 and 2, a magnetic stripe fare card is inserted into the add value terminal 2 through a fare card or transport entry bezel 10. The ticket transport 78 reads data from the magnetic stripe of the fare card, writes data to the fare card, and/or verifies the currently stored value and other available information on a fare card. In an alternate embodiment, the ticket transport 78 also has the capability to read from and write to contact fare cards by means of contact with contact pads on the contact fare cards. The ticket transport 78 sends/receives data from the control and memory circuit card assembly 52. In a preferred embodiment of the present invention, if a fare card fails to verify after writing, the ticket transport 78 will make three additional attempts to properly encode the fare card before returning it to the patron. Appropriate messages are displayed on the patron display 18 indicating successfully completed transactions or that an error condition exists with a suggestion to contact customer service. A message is transmitted to an area controller after each fare card transaction or periodically at pre-determined times.

The add value terminal 2 of a preferred embodiment also includes an audio printed circuit board (PCB) 74 having a digital voice synthesizer. The audio PCB 74 creates a computerized voice from an ASCII text input. An audio filter reduces noise and an amplifier increases audio output power. The audio PCB 74 is connected to and controlled by the control and memory card assembly 52. As shown in FIG. 1, a standard ⅛-Inch audio jack 30 is provided on the add value terminal 2 front panel for privacy when listening to the information, instructions, and prompts. Audio capability is provided on the add value terminal 2 to maintain consistency with existing automatic vending machines of transit systems such as those available in the New York City Transit automatic vending machines. The audio PCB 74 of the present invention may be identical to the audio card utilized in existing transit automatic vending machines to minimize production and installation costs and inventory count.

The add value terminal 2 of a preferred embodiment includes a contactless smart card reader 28 for transit systems that utilize contactless smart cards. The smart card target assembly 56, as shown in FIG. 2*a*, provides the means for the passengers to add value to their contactless smart cards. The smart card target assembly 56 communicates directly with the control and memory circuit card 52 through an RS-422 port. The contactless smart card reader 28 of a preferred embodiment has the capability to read, write, and verify a smart card utilizing any of the contactless smart card communication protocols that are known in the art. This capability is particularly desirable for add value terminals 2 that are available outside of a transit area, such as in a grocery store, where the terminal is used to add value to fare cards of various transit links that utilize varying smart card communication protocols.

As shown in FIG. 1, the add value terminal 2 includes a security mirror 16 that provides the patron with a view of anyone approaching from behind. In a preferred embodiment of the present invention, the security mirror also serves as a cover plate for a security camera that utilizes a dedicated line to a video recorder that is located outside of the added value terminal 2.

Figure 2B:
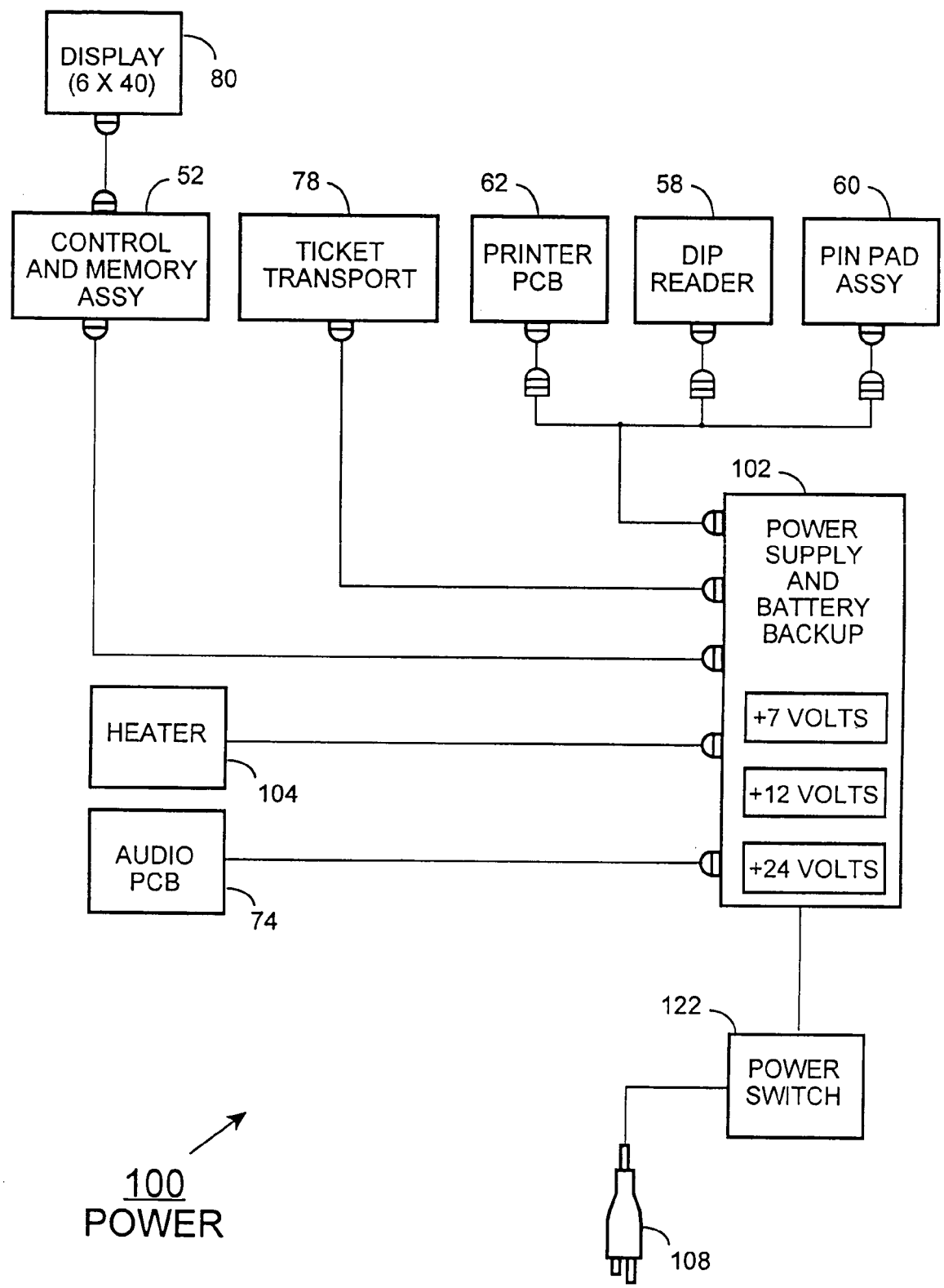
FIG. 2b is a block diagram of the power circuitry for a terminal of a preferred embodiment.

FIG. 2b illustrates a power block diagram 100 for a preferred embodiment of the present invention. The add value terminal utilizes a multiple output DC power supply and battery backup 102 which provides the various DC voltages to all internal components. The power supply requires a 120V, 60 Hz input represented by an AC plug 108. The add value terminal also requires a 10 Amp, single phase AC service connection at time of installation. A single power switch 122 located inside the add value terminal cabinet removes all power. The battery backup of the preferred embodiment provides sufficient operating power to complete a present transaction for a maximum of 30 seconds. If the transaction is not completed within 30 seconds, the add value terminal will cancel the transaction and return the card to the patron.

A heater 104 is provided to maintain an acceptable operating temperature for the components within the add value terminal. The add value terminal is designed to withstand the environmental operating conditions encountered in the transit environment, outdoor environments exposed to wind driven rain and snow, and other out-of-system environments such as hotel lobbies and grocery stores. The add value terminal of a preferred embodiment is designed to perform without failure after exposure to the environmental conditions resulting in operating temperatures ranging from −10 to 120 degrees Fahrenheit, and operating humidity ranging from 20% to 97% non-condensing.

Referring to FIG. 2a, a keypad 82 and the front panel patron display 80 are provided to aid in the isolation of the add value terminal fault conditions during maintenance procedures. During a test mode of a preferred embodiment, terminal status data including audit register data, machine mode, location identification, machine number, time, and date as well as internal diagnostic results are displayed on the patron display 80. As shown in FIG. 3, all information is transmitted to the station controller 226 then to the area controller 200. The add value terminal of the preferred embodiment includes diagnostic procedures to assist the maintenance technician with the performance of repair actions.

Referring again to FIG. 2a, the add value terminal of a preferred embodiment also includes status and maintenance switches connected to the control and memory circuit card assembly 52. A door open switch 76 informs the control and memory circuit card 52 that the front door 36, as shown in FIG. 1, has been opened indicating a possible security breach. The control and memory card assembly 52 sends the switch status to the station controller to alert personnel of the possible security breach. Operation of the add value terminal is suspended unless a maintenance log-in is properly executed. In a preferred embodiment of the present invention, front door switches 66, including switch A 68, switch B 70, and switch C 72, are also provided for terminal identification purposes and diagnostic procedures.

The add value terminal 2 is designed to conform with the American with Disabilities Act (ADA) requirements, Section 4.34 of the U.S. Federal Government ADA Accessibility Guidelines for Buildings and Facilities. Specifically, the AVT 2 of a preferred embodiment is installed so that its maximum reach height does not exceed 54 inches (137 cm) from the floor, the maximum reach depth does not exceed 5 inches (12.7 cm). In addition, raised letter text 20 is a minimum of ⅝ inches tall (1.59 cm) and is raised 0.030 inches (0.076 cm) for tactile feel with contrasting color to the background. Braille 32 is included next to all patron interfaces to facilitate use by the visually impaired. In addition to the above, the digital voice synthesizer 74 (the audio PCB) as shown in FIG. 2a is used to create a computerized voice for prompting and instructing the patron. Referring to FIG. 1, a patron accesses AVT audio output via an audio jack 30 utilizing a patron-supplied headset.

The primary function of the add value terminal is to add value or time to a fare card using a credit or debit card. Referring to FIG. 1, the commuter/patron utilizes the add value terminal 2 to add value to either a magnetic stripe fare card, a contact smart card, or a contactless smart card. Fare cards that utilize magnetic stripes are inserted into the fare card bezel 10. Contact smart cards of the preferred embodiment are inserted into a contact reader (not shown), or are accepted by either of the debit/credit card reader 26, or the magnetic stripe fare card reader 26. Communication between a contactless smart card and the add value terminal 2 is accomplished by waving a contactless smart card past the smart card reader 28. All patron interaction is accomplished using the selection buttons 6, the cancel button 8, the PIN keypad 22, and the patron display 18.

In the preferred embodiment, a patron display 18 prompts the passenger on how to present the appropriate fare card. For example, the patron display 18 prompts the passenger to insert a magnetic stripe fare card into the entry bezel 10 as illustrated by a depiction of the fare card 34 on the face of the add value terminal 2. In other embodiments, the magnetic stripe fare cards are inserted according to an orientation of a magnetic stripe reader internal to the AVT 2. The display 18 prompts the passenger to insert contact cards into the appropriate reader bezel, that is, either the debit/credit bezel 26 or the fare card bezel 10. The display 18 prompts the passenger to wave a contactless fare card over the target 28. After the patron has presented the fare card as prompted, the patron display 18 shows the current period and card expiration dates, the remaining value, the number of rides remaining, and the upgrade status of the card.

The patron display 18 then prompts the patron to select the add value or add time transaction. The patron makes the appropriate selection using the selection buttons 6, and selects the desired value or time. The patron display 18 is updated to the selected value/time to be purchased. Next, the display 18 prompts the patron for the payment method to be used, and a choice of either a credit or debit (ATM) card is displayed. The patron selects the method of payment by depressing the appropriate selection button 6, and the display 18 prompts the patron to insert the debit or credit card into the debit/credit card reader 26. If the debit/credit card reader 26 is utilized to read a contact smart card, then the patron is prompted to first remove the contact smart card.

If a debit card is used as a payment vehicle, the patron is requested to enter a 4-digit personal identification number (PIN) number on the PIN pad 22. In one embodiment of the invention, an authorization request is then sent to the bank via the station controller 226 as shown in FIG. 3, through the Area controller 200 that is connected to an existing bank authorization network. Prior to updating the fare card, the display prompts the patron to select whether a receipt is desired. Authorization is received from the bank and is communicated to the add value terminal 238 via the station controller 226 from the area controller 200. In another embodiment where the patron's smart card is identified as a special status fare card, that is, pre-authorization to add value to the card through an existing line of credit, then the patron need not present a credit/debit card since the patron's debit/credit card information is on file with the transit authority. In such a circumstance, the patron simply requests that value be added to the fare card. The steps of requesting authorization may be performed at a latter time by the transit system area controller. Th special status fare card may be identified by serial number by the transit area controller. In addition, the special status fare card may have a flag in its memory designating it as a special status fare card.

Referring to FIG. 1, if the fare card is a magnetic stripe fare card or a contact card which has been inserted into the fare card bezel 10, the fare card is encoded with the required information and returned to the patron via the same fare card bezel 10. If the contact card communicates with the AVT through the credit/debit card reader 26, the patron is prompted to re-insert the card. If a contactless fare card is being utilized, the patron is prompted to wave the card by the target 28 to complete the transaction. If requested, a receipt is dispensed in the printer receipt cup 24. The patron display 18 then shows the complete transaction information including the remaining value, period and card expiration dates, remaining rides, and upgrade status. The patron may cancel the transaction process at any time by pressing the cancel button 8. If the patron cancels the transaction after authorization has been received or the add value terminal 2 cannot issue or encode the fare card, the AVT 2 generates a reversal transaction and transmits it to the area controller 200.

The AVT 2 of a preferred embodiment is designed to achieve an mean cycle between failure (MCBF) of at least 30,000, where a cycle is defined as the completion and/or cancellation of a transaction with a receipt. Cancellation occurs when transaction processing cannot be completed and the fare card is returned to the patron, or when a transaction is terminated by the patron using the cancel button 8. The AVT 2 transactions that may be performed by the patron include add value and print debit/credit receipt, add value without printing debit/credit receipt, add time and print debit/credit receipt, and add time without printing debit/credit receipt. Add value terminal 2 MCBF is based upon a receipt being generated for each transaction. MCBF improves if patrons choose not to have a receipt printed as a result of a debit/credit transaction.

The added value terminal 2 of a preferred embodiment is compact in order to simplify installation and maintenance. The add value terminal 2 may be installed in stations or locations where a full function automatic vending machine is not desired or warranted. As shown in FIG. 3, the add value terminal 238 may be installed into an existing transit automatic fare collection system. In a preferred embodiment, the add value terminal utilizes many of the components of the transit system to maintain compatibility with the existing system. Referring to FIG. 2a, components that may be identical to the existing transit system components include the control and memory card assembly 52, the receipt printer assembly 62, the debit/credit PIN pad assembly 60, the debit/credit card reader 58, the Audio PCB 74, the intrusion switch 76, and the high security locks 4, 12 as shown in FIG. 1.

FIG. 3 illustrates a typical transit system network that includes a primary control area 222, a secondary control area 216, and out-of-system add value terminals 202. The out-of-system add value terminal 210 and the in-system add value terminal 238 is designed to communicate to the area controller 200 via station controllers 206, 226 within the automatic fare collection network. Information transmitted between the area controller 200 and add value terminals 210, 238 includes status messages, audit registers, fare card update transaction data, debit/credit transaction data, fare validation tables and other relevant parameters, minimum/maximum purchase values, and negative lists. Additional add value terminal status messages are generated and sent to the area controller 200 including battery low, paper jam, paper low/out, transport error, power fail, and door open.

Out-of-system add value terminals 210, that may be located in outlets such as supermarkets and retail stores, offer availability of an add value terminal 210 in environments that eliminate much of the potential for petty theft and other security concerns. Fare cards are often available through merchant locations wherein the merchant receives a commission according to a commission schedule for pre-valued cards. Fare card customers benefit from the availability of AVTs by not having to wait in lines behind customers with multiple purchases when they wish to add value or time to their fare card. Out-of-system locations may include, but not be limited to hotels, air-ports, major buildings, shopping malls/centers, post offices, hospitals, bus terminals, libraries, housing complexes, sports venues, and senior citizen complexes.

As shown in FIG. 3, the out-of-system add value terminal 210 is connected to a communications breakout box 208. Expansion ports 212 for additional system equipment including add value terminals are available for connection to the communication breakout box 208. The communications breakout box 208 is connected to an out-of-system station controller 206 that is connected to the area controller 200 via a data service unit 204.

The area controller 200 of the preferred embodiment is connected to the primary control area 222, and out-of-system control area 202 utilizing conditioned four-wire digital lines or fiber optic networks. The preferred embodiment specifies a 9,600 Baud rate. The primary control area 222 includes station controller 226 connected to the area controller 200 via a data service unit 224. The station controller 226 is connected to a communications breakout box 228 that has several port connections including a connection to a communication expansion panel 218 of a secondary control area 216, and a communication expansion panel 236 of the primary control area. A fiber optic communication line 230 connects the communications breakout box 228 with the secondary control area 216. A fiber optic modem 214 is also connected to the secondary control area 216. The expansion panel 218 of the secondary control area 216 is further connected to a station network module 220.

Communications from the communications breakout box to the communication expansion panel 236 of the primary control area 222 is accomplished utilizing an RS-232 connection 234. A bi-directional communication channel connects a primary control area station network module 232 to the communication expansion panel 236. In a preferred embodiment, a communication expansion panel 236 connected to one of the ports of the communications breakout box 228 has eight RS-422 synchronous duplex serial ports with a 9,600 or greater baud rate. A first port of the eight RS-422 ports having expansion capability 246 is connected to an add value terminal 238.

Transit system turnstiles 240, fare card readers 242, and automatic vending machines 244 are also connected to the available serial ports of the communication expansion panel 236. The communication expansion panel 236 also serves as a connection between the station controller 226 and the token booth control unit 248 of the token booth equipment 262. The token booth control unit 248 controls and monitors a token booth printer 250 a TAG antenna 252, and token booth keyboard 254, a token booth display 258, and token booth reader 260, and a token booth encoder/reader 256.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. Therefore, this invention is to be limited only by the following claims, which include all such other embodiments and modifications when viewed in conjunction with the above specification and accompanying drawings.

We claim:

1. A terminal for conducting a plurality of cashless transactions for adding value to a plurality of fare cards, the terminal comprising:
    a patron display for displaying information and instructions to a patron for adding value to a fare card of the plurality of fare cards;
    at least one fare card reader for reading from and writing to the fare card;
    a payment interface means comprising a debit/credit card reader for accepting as a payment mechanism, solely at least one of a credit card and a debit card; and
    a control and memory assembly comprising:
        means for controlling the patron display;
        means for communicating with the at least one fare card reader for reading from and writing to the at least one fare card to complete at least one cashless transaction of the plurality of cashless transactions;
        means for communicating with the payment interface means to obtain debit/credit information; and
        means for storing a history of the at least one cashless transaction.

2. The terminal of claim 1, wherein the plurality of fare cards comprises contactless smart cards; and magnetic stripe cards.

3. The terminal of claim 2, wherein the plurality of fare cards further comprises contact smart cards.

4. The terminal of claim 3, wherein the at least one fare card reader comprises: a contactless smart card reader; a magnetic stripe card reader; and a contact card reader.

5. The terminal of claim 4, wherein one of the contactless smart card reader and the magnetic stripe card reader comprises the contact card reader.

6. The terminal of claim 2, wherein the at least one fare card reader comprises: a contactless smart card reader; and a magnetic stripe card reader.

7. The terminal of claim 1, wherein the control and memory assembly is coupled to a transit station area controller, and wherein the history of the at least one cashless transaction is uploaded from the control and memory assembly to the transit station area controller at a pre-determined time.

8. The terminal of claim 7, wherein the pre-determined time for uploading the history is after each cashless transaction of the plurality of cashless transactions.

9. The terminal of claim 1, wherein the fare card is a special status fare card, and wherein the control and memory assembly adds value to the special status fare card without obtaining the credit/debit information through the debit/credit card reader.

10. The terminal of claim 1, further comprising a plurality of selection buttons adjacent the patron display for selecting options in response to the displayed information and instructions.

11. The terminal of claim 1, further comprising means for issuing a new or recycled fare card.

12. An add value terminal for adding value to a plurality of fare cards, the add value terminal for conducting a plurality of cashless transactions, the add value terminal comprising:
    a display for displaying instructions and options to a patron;
    a contactless fare card reader for reading from and writing to a contactless fare card of the plurality of fare cards;
    a magnetic stripe fare card reader for reading from and writing to a magnetic stripe fare card of the plurality of fare cards;
    a debit/credit card reader for accepting at least one of a credit card and a debit card; and
    a control and memory assembly for controlling the patron display, the control and memory assembly coupled to the contactless fare card reader and the magnetic stripe fare card reader for reading from and writing to the plurality of fare cards to complete a cashless transaction of the plurality of cashless transactions, the control and memory assembly for storing a history of the cashless transaction.

13. The add value terminal of claim 12, further comprising a contact card reader for reading from and writing to a contact fare card.

14. The add value terminal of claim 12, wherein the magnetic stripe fare card reader comprises means for reading from and writing to contact smart cards.

15. The add value terminal of claim 12, wherein the debit/credit card reader comprises means for reading from and writing to contact smart cards.

16. The add value terminal of claim 12, further comprising a communication line for coupling the control and memory assembly to a transit station area controller, and wherein the history of the cashless transaction is uploaded from the control and memory assembly to the transit station area controller at a pre-determined time.

17. A method of adding a plurality of transaction values to a plurality of fare cards, said method comprising the steps of:
    providing a terminal in communication with a transit station controller for adding value to the plurality of fare cards utilizing credit and debit accounts only;
    displaying instructions on said terminal for prompting a patron;
    reading a fare card of the plurality of fare cards utilizing one of a magnetic stripe card reader and a contactless card reader;
    communicating with the transit station controller for authorizing a transaction value of the plurality of transaction values; and
    writing the authorized transaction value to the fare card utilizing the one of a magnetic stripe card reader and the contactless card reader.

18. The method of claim 17, wherein the steps of reading from and writing to the fare card of the plurality of fare cards utilizes one of a magnetic stripe card reader, a contactless card reader, and a contact card reader.

19. The method of claim 17, wherein the step communicating with the transit station controller for authorizing a transaction further comprises: reading a debit/credit card utilizing a debit/credit card reader to obtain debit/credit card information for authorizing the transaction value.

20. The method of claim 17, wherein the step communicating with the transit station controller for authorizing a transaction further comprises: verifying that the fare card is a special status fare card, wherein the transit station controller has pre-authorization to utilize stored debit/credit information for authorizing the transaction value.

* * * * *